United States Patent [19]
Bean

[11] Patent Number: 5,667,000
[45] Date of Patent: Sep. 16, 1997

[54] LOG COPING JIG

[76] Inventor: Bruce M. Bean, 5545 W. 4330 South, West Valley, Vt. 84120

[21] Appl. No.: 613,123

[22] Filed: Mar. 8, 1996

[51] Int. Cl.$^6$ .................................................. B27C 5/02
[52] U.S. Cl. .......................... 144/136.7; 144/136.95; 144/371
[58] Field of Search .......................... 144/2.1, 134.1, 144/136.7, 136.45, 154.5, 371

[56] References Cited

U.S. PATENT DOCUMENTS

| | | | |
|---|---|---|---|
| 2,702,569 | 2/1955 | Yelle | 144/136.95 |
| 4,742,856 | 5/1988 | Hehr et al. | 144/154.5 |

*Primary Examiner*—W. Donald Bray
*Attorney, Agent, or Firm*—Terry M. Crellin

[57] ABSTRACT

A machine for cutting a cope or kuda in the end of a log has a base member that is secured to a longitudinal side of the log. A support member is attached to the base member. A sleeve is associated with the support member, and an elongate shaft extends longitudinally through an elongate opening through the sleeve. A router is attached to the elongate shaft near one end of the shaft. The sleeve is pivotally mounted to the support member so that the longitudinal axis of the elongate shaft that extends through the sleeve can be set to any desired, acute angle of up to 90 degrees with the longitudinal axis of the log. The shaft can be moved longitudinally back and forth through the sleeve, and the shaft can also rotate about its longitudinal axis. This allows the router to be moved back and forth over the end of the log to cut an incurved, cylindrical cut into the end of the log, with the axis of the cylindrical cut being set at any desired degree of slope relative to the longitudinal axis of the log.

4 Claims, 4 Drawing Sheets

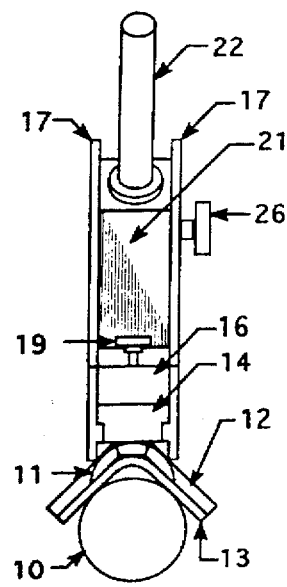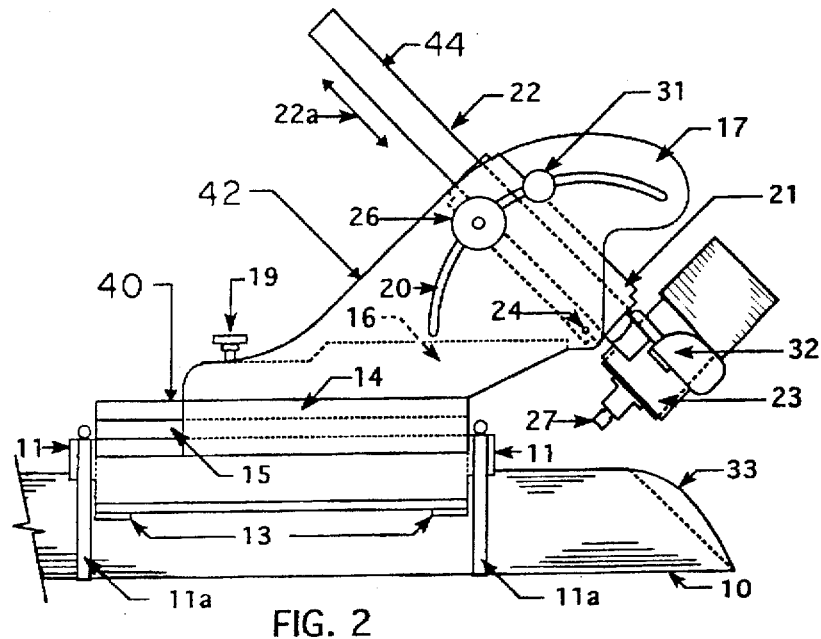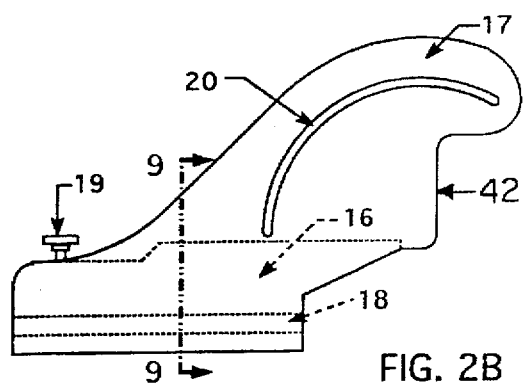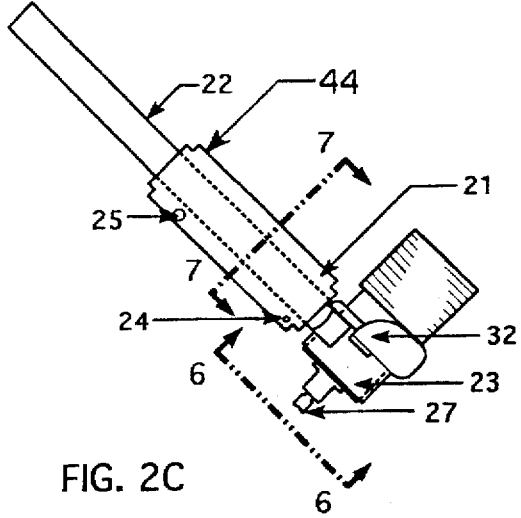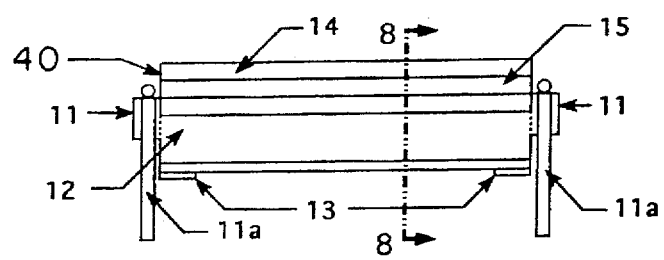
FIG. 1
FIG. 2
FIG. 2B
FIG. 2C
FIG. 2A

LOG COPING JIG

BACKGROUND OF THE INVENTION

1. Field of the Invention

The present invention relates to a machine for cutting a cope at the end of a turned log rail. The cope, or "kuda", as it is called in some areas, is a curved cut which allows the log rail to be joined (by means of lag bolts in counter-bored holes) to vertical posts. The joint thus formed is tight and aesthetically pleasing.

2. State of the Art

It is the common practice of skilled artisans to hand cut the cope or kuda in the end of the log rail by means of conventional, hand tools such as coping saws and chisels. There has been no suggestion, to the best of the present inventor's knowledge, of a specialized tool for use with a router for cutting the cope or kuda in the end of a log rail.

OBJECTIVES AND SUMMARY OF THE INVENTION

It is an object of the invention to provide a log coping jig which can be situated on a log rail, with the end of the log rail being subjected to the action of a router bit which is moved in an arcuate motion across the end of the log in accordance with the constraints of the various components of the jig of the present invention.

It is another object of the invention to provide a log coping jig with router and means for cutting a controlled, arcuate cope or kuda in the end of the log such that the end of the log will form an aesthetic intersection with a post irrespective of whether the log intersects the post at a 90 degree angle or any angle less than 90 degrees.

It is a further object of the invention to provide a log coping jig with router wherein the router bit is allowed to move in two directions simultaneously, with the first movement being linear and with the second movement being arcuate in a plane that is substantially perpendicular to the first, linear movement.

It is yet another object of the invention to provide a log coping jig with router that includes a base member that is to be secured to the log, with means being provided to allow the coping jig and router to be adjusted within a limited range along the base member in either direction of the log's length.

In accordance with the present invention, a machine is provided for cutting a cope or kuda in the end of a log. The machine has a base member that is secured to a longitudinal side of the log. A jig is attached to the base member, and a router is secured to the jig. The jig, as will be fully explained hereinafter is adapted to guide the bit of the router in a two motions that can be performed simultaneously. The first motion is a linear movement of the bit, and the second motion is an arcuate movement of the bit in a plane that is substantially perpendicular to the first, linear motion.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 1 is a rear end elevation view of the device of the present invention;

FIG. 2 is a left side elevation view of the device of FIG. 1;

Figure 3:
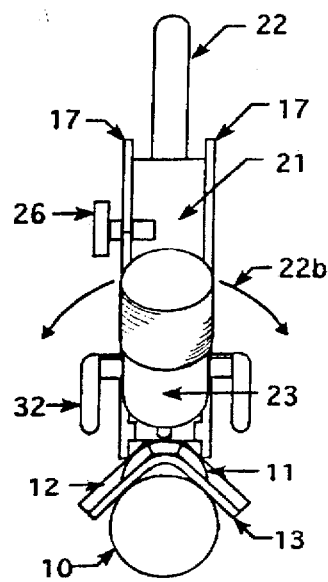
Figure 4:
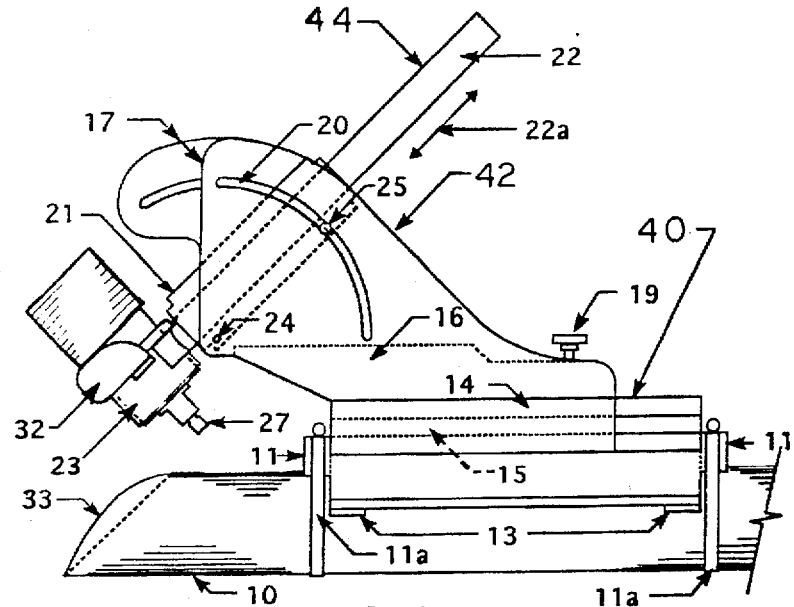
Figure 5:
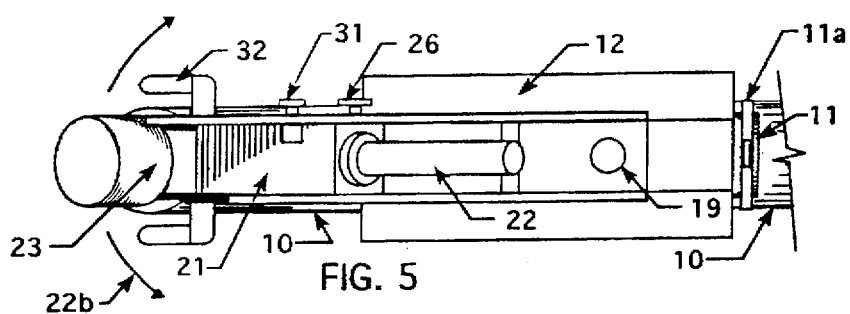
Figure 6:
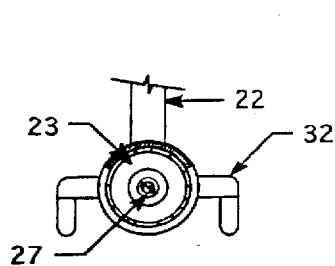
Figure 7:
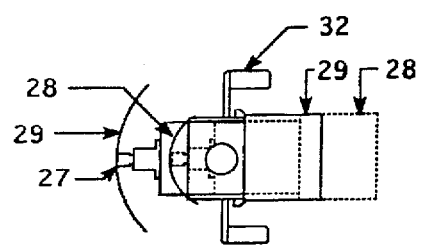
Figure 8:
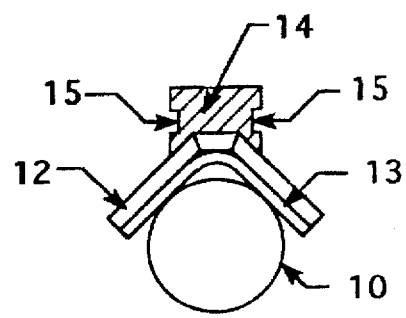
Figure 9:
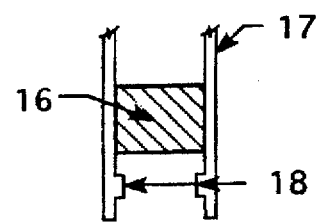
Figure 10:
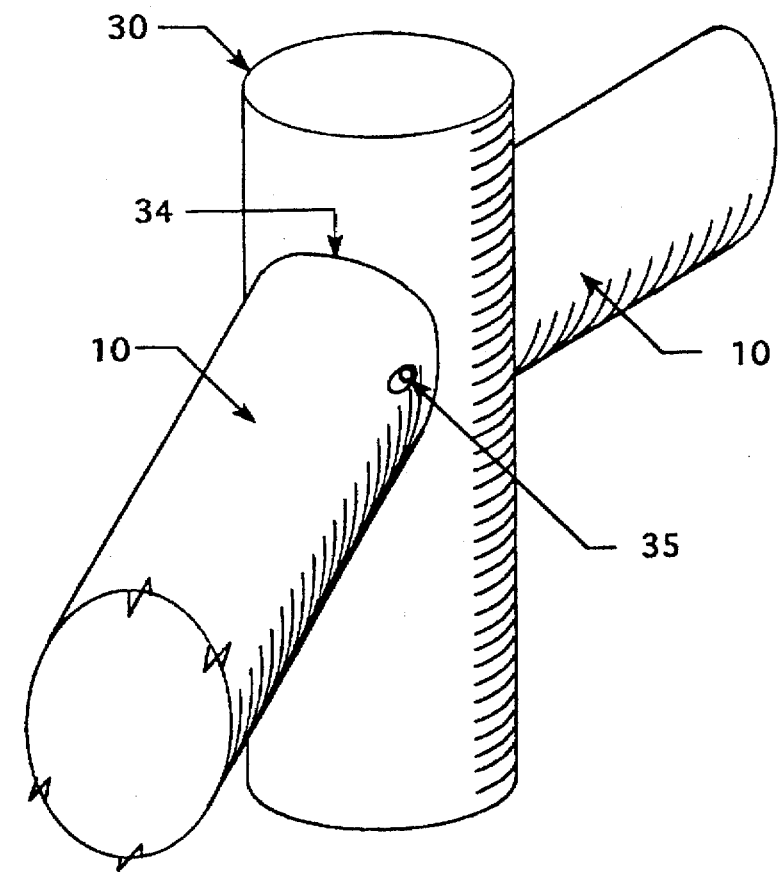
Figure 11:
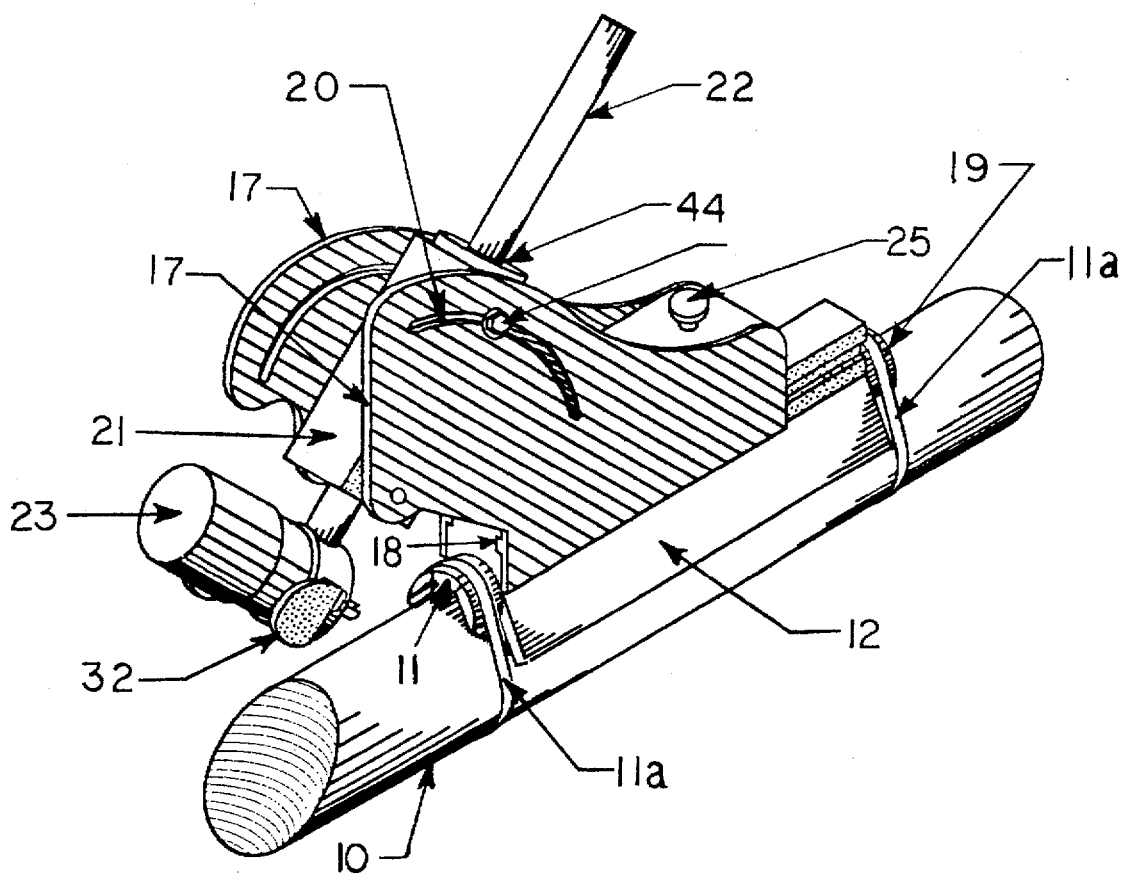

FIGS. 2A, 2B, and 2C are side elevation views of the three major components, respectively, of the device of FIG. 1;

FIG. 3 is a front end elevation view of the device of FIG. 1;

FIG. 4 is a right side elevation view of the device of FIG. 1;

FIG. 5 is a top view of the device of FIG. 1;

FIG. 6 is a sectional view taken along line 6—6 of FIG. 2C showing the front end of the router, the bit, the handles and the arm shaft;

FIG. 7 is a sectional view taken along line 7—7 of FIG. 2C showing the top of the router and the arm shaft;

FIGS. 8 and 9 are sectional views taken along lines 8—8 and 9—9 of FIGS. 2A and 2B, respectively;

FIG. 10 is an isometric representation of the juncture of a portion of both sloped stairway and level deck rails as they intersect the vertical post; and FIG. 11 is an isometric representation of the device of FIG. 1 as viewed from the right front quarter.

DETAILED DESCRIPTION OF THE ILLUSTRATED EMBODIMENTS

Like reference numerals designate like parts in those figures of the drawings in which they occur. Electrical conductors, a workbench, and some balance springs have been omitted from the drawings for clarity.

The base component 40 (shown by itself in FIG. 2A) is intended to clamp to the workpiece 10, such as a turned log, by the use of adjustable band clamps 11a. The base component 40 is composed of a piece 12 of ¾" birch plywood that is formed to a right angle. The piece 12 is fastened to two aluminum right angle braces 13 for strength. The ends 11 of the base component 40, as shown in FIGS. 1 and 2A, are rounded to accept the band clamps 11a. On top of the piece 12 of plywood is fastened a solid maple piece 14 which is formed with a groove 15 on either side. A sectional view is pictured in FIG. 9.

An arm support component 42 (shown by itself in FIG. 2B) sets on top of the base component 40 and is composed of a solid maple piece 16 sandwiched between the two sides 17 which are formed of ½" birch plywood. The arm support component 42 is fixed securely vertically and laterally by the tenons 18 (FIGS. 2B and 9) which fit into the grooves 15 in the base component 40 (FIGS. 2A and 8) and slides longitudinally unless locked down by use of the knob 19. The sides 17 are slotted in an arc 20 for reasons presently described.

An arm component 44 (shown by itself in FIG. 2C) fits in between the sides 17 of the arm support component 42 as shown in FIG. 1. The arm component 44 is composed of three major parts. A sleeve 21 is a solid maple rectangular shaped member with a hole drilled through the length of it. A shaft 22, also of solid maple, is turned to a diameter to fit snugly but easily through the long hole in the sleeve 21. A router 23 is fastened to the lower end of the shaft 22. The axis of the router 23 is oriented perpendicular to the axis of the shaft 22.

The sleeve 21 is also provided with two smaller holes at right angles to the long hole. The lower of these holes, shown by the numeral 24 in FIG. 2C, accommodates a bolt through the sleeve 21 and the sides 17 of arm support component 42. This allows the arm component 44 to rotate radially in a vertical plane parallel with the long direction of the base component 40 and workpiece 10 (turned log). The other of the holes in the sleeve 21, shown by the numeral 25 in FIG. 2C, accommodates a bolt and knob 26 that extends through the sleeve 21 and sides 17 of the arm support component 42. The bolt and knob 26 slide in the slot 20 and may be tightened to secure the arm support component 42 in any position within an arc of 90 degrees.

A router 23 is fastened on the end of the shaft 22. By being mounted on the shaft 22, the router can be moved in two different motions, either one at a time or simultaneously. The first motion is a linear motion in which the router 23 and its bit move in a linear motion in a direction that is parallel to the axis of the shaft 22. This motion is accomplished by sliding the shaft 22 up and down within the sleeve 21 as indicated by the double arrowed line identified by the numeral 22a in FIGS. 2 & 4. The other or second motion of the router 23 and its bit is an angular rotation movement that is accomplished pivoting the router 23 about the axis of the shaft 22 in a plane perpendicular to the axis of the shaft 22, as indicated by the double arrowed line identified by the numeral 22b in FIGS. 3 & 5.

The router 23 is also adjustable by screw rotation and clamp to provide a range of radii from the center of the shaft 22 to the cutting surface of the bit 27, as shown in FIG. 7. At the minimum setting 28 a radius of 3" is obtained; at the maximum setting 29 a radius of 6" is obtained, resulting in a diameter range from 6" to 12". Therefore posts 30 (FIG. 10) of similar sizes can be intersected, resulting in a tight joint 34.

Operation

In operation, a workpiece 10 (turned log of any diameter from 2" to 12") is placed on a workbench and secured. A rough cut is made by other means to approximately 2" from the final cut line. The base component 40 of the apparatus of the present invention is placed upon the workpiece 10 and clamped thereon with the band clamps 11a. The correct angle between the longitudinal center axis of the base component 40 and the sleeve 21 is established and then set by the knob 26.

A stop 31, sliding with the slot 20, is brought to bear against the sleeve 21 and secured. Then the shaft 22 of the arm component 44 is backed off sufficiently (that is, the angular distance is decreased between the sleeve 21 and the base component 40) to allow a pass to be made over the end of the workpiece 10 with the router 23 such that a portion of the wood is routed off. A pass involves the operator grasping the two handles 32 of the router 23, depressing two trigger switches to energize the router 23, then manually moving the router 23 and shaft 22 down and up while rotating it, to pass over the entire surface 33. Subsequent resettings of the shaft 22 of the arm component 44 to larger angles, and repasses with the router 23 will result in the final cut. It will typically take three or four passes to return to the stop 31, which is the originally set angle. The final cut obtains a surface which is straight in the vertical plane parallel to the long axis of the workpiece 10, and curved in a direction normal to that.

That completes the operation. The work-piece 10 can then be counter-bored 35 and fastened in place to the matching vertical post 30. Other applications are undoubtedly possible with the device, such as balusters, the vertical members between rails in a staircase.

Obviously the invention is susceptible to changes or alterations without defeating its practicability. The prototype model is constructed of the wood materials described herein; later production models probably would be of metal. Although a preferred embodiment of the apparatus of the present invention has been illustrated and described, it is to be understood that the present disclosure is made by way of example and that various other embodiments are possible without departing from the subject matter coming within the scope of the following claims, which subject matter is regarded as the invention.

I claim:

1. A machine for cutting the end of a log to provide an inwardly curved surface of a given radius that matches the curved side surface of another log of equal radius, said machine comprising:

a base member adapted to be secured to a longitudinal side of said log;

a support member attached to said base member;

a sleeve member having an elongate cylindrical opening extending therethrough;

means for pivotally mounting said sleeve member to said support member so that the sleeve member can pivot about one of its ends, whereby a central, longitudinal axis of said cylindrical opening lies in a plane through a longitudinal, center axis of said support member;

means for adjustably setting said sleeve member so that the central, longitudinal axis of said cylindrical opening can be set to make any desired, acute angle of up to 90 degrees with the longitudinal, center axis of said support member;

an elongate shaft extending longitudinally through said cylindrical opening in said sleeve member, said shaft being adapted to rotate about its longitudinal axis as well as to move longitudinally back and forth within said cylindrical opening;

a router; and means for attaching said router to said elongate shaft at or near an end of said elongate shaft that extends toward the longitudinal, center axis of said support member when said sleeve is set so that said cylindrical axis of said sleeve makes an acute angle with the longitudinal center axis of said support member, said router being attached to said shaft so that a motor axis of said router is oriented perpendicular to the longitudinal axis of said elongate shaft.

2. A machine for cutting the end of a log in accordance with claim 1 wherein said base member has a longitudinal axis that extends along and is substantially parallel with a longitudinal side of said log when said base member is secured to said log; and said support member is attached to said base member by means that allow the support member to move back and forth along said base member in a direction parallel with a longitudinal axis of said base member.

3. A machine for cutting the end of a log in accordance with claim 2 wherein said base member has a pair of longitudinal grooves extending along opposite lateral sides of said base member, said grooves being positioned near a top of said base member; and said support member has downwardly extending sides that slide along the opposite lateral sides of said base member, with each of said sides of said support member having longitudinal tenons that are received in said longitudinal grooves of said base members for sliding motion back and forth longitudinally in said longitudinal grooves.

4. A machine for cutting the end of a log in accordance with claim 3 wherein there is further provided means for releasably locking said support member to said base member in any selected position as said support member slides back and forth along said base member.

* * * * *